No. 685,850. Patented Nov. 5, 1901.
F. A. KELLEY.
VELOCIPEDE DRIVING MECHANISM.
(Application filed May 28, 1901.)
(No Model.)
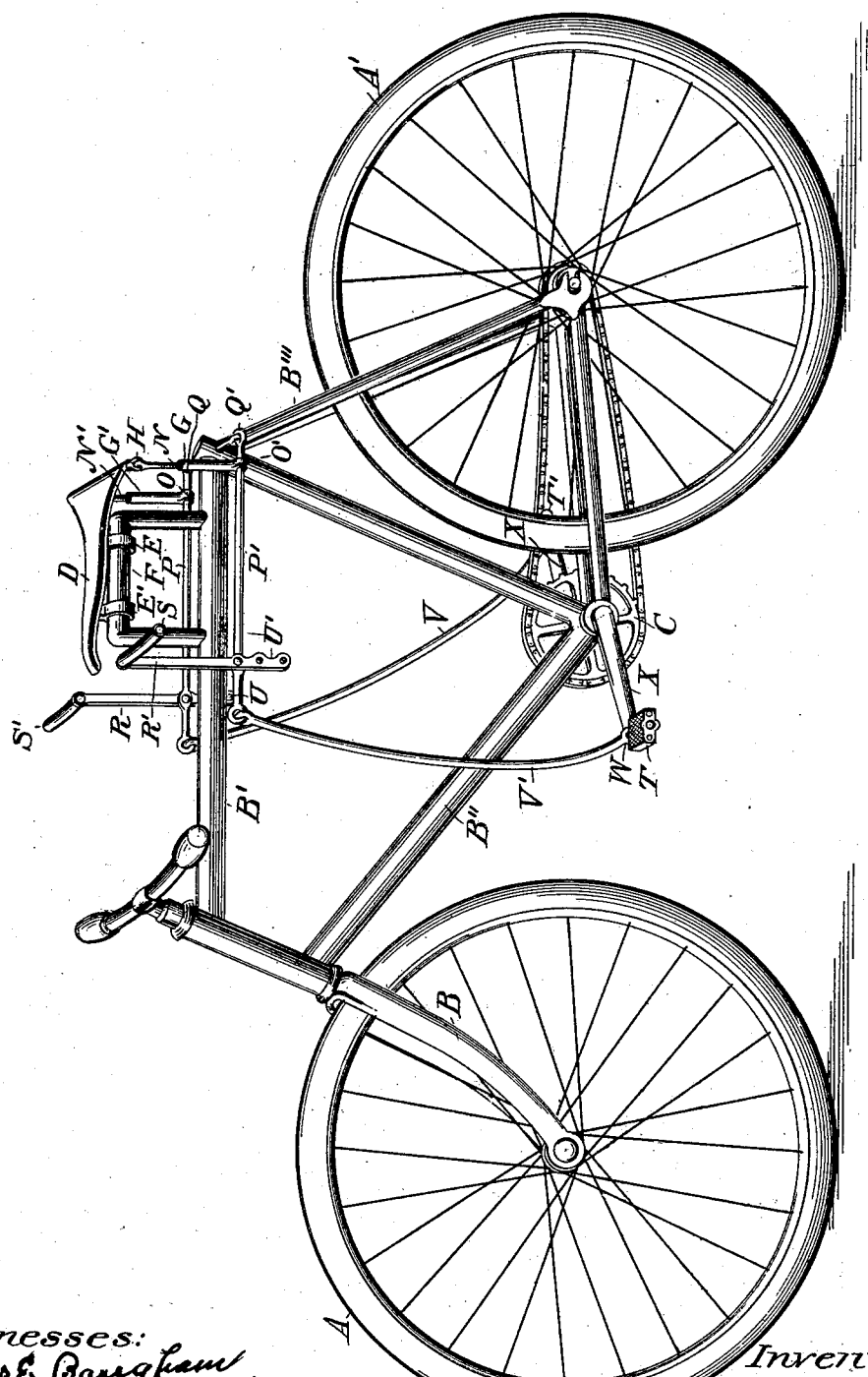
Witnesses:
Ross E. Baughman
Frank D. Streshly
Inventor:
Frank Anson Kelley

UNITED STATES PATENT OFFICE.

FRANK ANSON KELLEY, OF SUSANVILLE, CALIFORNIA.

VELOCIPEDE DRIVING MECHANISM.

SPECIFICATION forming part of Letters Patent No. 685,850, dated November 5, 1901.

Application filed May 28, 1901. Serial No. 62,287. (No model.)

*To all whom it may concern:*

Be it known that I, FRANK ANSON KELLEY, a citizen of the United States, residing at Susanville, in the county of Lassen, State of California, have invented a new and useful Improvement in Velocipede Driving Mechanism; and I do hereby declare the following to be a true and correct description of the same, reference being had to the annexed drawing, which forms a part hereof, and in which similar letters refer to similar parts throughout the entire view.

The drawing is a vertical side view of the entire device as and when attached to said vehicles.

The object of my invention is to so construct and arrange a seat or seats and the connecting operating mechanism for each and all of said vehicles that the weight of the rider will propel entirely or materially assist in propelling or running the same and also to use the greater and easier leg driving power of the rider applied to the thighs or upper part of the legs of the rider, and thereby making it much easier to run, faster in speed, and but little more expensive.

In the drawing let A A' represent the wheels of a bicycle or other vehicle, B, B', B", and B''' its frame, and C its sprocket wheel or gears. D is its seat, which seat is provided on its under part and at or near its lengthwise center with two or more eyelets or a sleeve E E' and through which a bar or shaft F freely passes and is attached to the bicycle-frame and upon which the seat rests and tilts or rocks.

G G' are two driving-rods hinged to the seat on its under outside part, at or near its rear end, by a ring or universal joint H H'. These rods extend downward a short distance and should be made in two parts, threaded and one screwing into the other, as shown at N N', so that their length can be increased or decreased as the seat is raised or lowered, as desired, and are hinged or loosely bolted near their lower ends O O' to and near the rear ends of the bars or rods P P', which are also hinged or loosely bolted to the upper part of the bicycle-frame at Q Q' and extending forward several inches and freely move vertically up and down and are also each provided with a short upright rod R R', hinged or loosely bolted to them a short distance in front of the seat and extending upward and provided near their upper ends with a roller having its exterior surface made of rubber or other soft material and provided with a metal center tube or lining revolving upon metal pins S S', both roller and pins extending horizontally outward several inches. Upon these rollers the under side of the thigh of the rider rests and presses downward and forward alternately and automatically as the rider's foot descends in revolving each of the bicycle-pedals T T', and at its lower end should extend low enough to and be provided with several tubular holes, thereby making it adjustable to any desired height, as shown at U U', and also provided near their outward ends with hinged or loosely - bolted driving-rods V V', slightly bent or curved forward and extending down to and hinged or jointed upon the rods of the foot-pedals W W' near their inside connection with the pedal-cranks X X' by means of freely-revolving boxes or holes, thus enabling the rider to use his weight by means of the tipping or rocking seat and also the power as applied near the upper part of the thigh, in combination and in connection with his foot-power, to drive and push the pedal forward and downward and applied to and at the outside part or length of the foot-pedal crank in propelling the bicycle instead of at the end of a short crank, and not provided with the leg or thigh rests R R', as shown and described in United States patent granted to me March 12, 1901, No. 669,645, for which application was filed November 1, 1900, Serial No. 35,188.

What I claim as my invention and as new and useful, and desire to secure by Letters Patent, is—

1. A bicycle-saddle pivoted to turn laterally on a support in the vertical longitudinal plane of the bicycle, and provided with jointed rods N O, N' O', in combination with the rods P' jointed at Q' to frame and the rods V' jointed to said rods P' as well as to the pedal-cranks as shown and described.

2. In a bicycle propelling mechanism substantially as described, the combination with the jointed rods P' of the vertical bars U' provided with the thigh-rests S S' adapted to be used in the manner described.

In testimony whereof I have signed my name to this specification in the presence of two subscribing witnesses.

FRANK ANSON KELLEY.

Witnesses:
  GEO. L. TOMB,
  LOUIS D. HALL.